United States Patent
Lu et al.

(10) Patent No.: US 7,490,318 B2
(45) Date of Patent: Feb. 10, 2009

(54) COMPUTER PLATFORM OPERATING SYSTEM COMPATIBILITY MANAGEMENT METHOD AND SYSTEM

(75) Inventors: Ying-Chih Lu, Taipei (TW); Meng-Hua Cheng, Taipei (TW); Chun-Lung Wu, Taipei (TW); Chia-Hsing Lee, Taipei (TW); Chi-Tsung Chang, Taipei (TW); Ling-Hung Yu, Taipei (TW)

(73) Assignee: Inventec Corporation, Taipei (TW)

( * ) Notice: Subject to any disclaimer, the term of this patent is extended or adjusted under 35 U.S.C. 154(b) by 735 days.

(21) Appl. No.: 11/067,532

(22) Filed: Feb. 25, 2005

(65) Prior Publication Data

US 2006/0195836 A1    Aug. 31, 2006

(51) Int. Cl.
*G06F 9/44* (2006.01)
(52) U.S. Cl. .................................................. 717/122
(58) Field of Classification Search ....................... None
See application file for complete search history.

(56) References Cited

U.S. PATENT DOCUMENTS

| | | | | |
|---|---|---|---|---|
| 5,887,163 A | * | 3/1999 | Nguyen et al. .................. 713/2 |
| 6,079,016 A | * | 6/2000 | Park ................................ 713/2 |
| 6,088,794 A | * | 7/2000 | Yoon et al. ..................... 713/2 |
| 6,466,998 B1 | * | 10/2002 | Bennett ....................... 710/48 |
| 2007/0078891 A1 | * | 4/2007 | Lescouet et al. ......... 707/104.1 |

* cited by examiner

*Primary Examiner*—Wei Y. Zhen
*Assistant Examiner*—Philip R. Wang
(74) *Attorney, Agent, or Firm*—Jianq Chyun IP Office

(57) ABSTRACT

A computer platform operating system compatibility management method and system is proposed, which is designed for use in conjunction with a computer platform, such as a network server, for the computer platform to be selectively bootable between an old-version operating system (such as Windows NT4.0) and a new-version operating system (such as Windows Server 2003 or Windows 2000). This feature allows the customer to selectively install either an old-version operating system or an new-version operating system successfully onto the server, and allow both old-version operating system and new-version operating system to be compatible with the hardware of the server.

6 Claims, 2 Drawing Sheets

COMPUTER PLATFORM OPERATING SYSTEM COMPATIBILITY MANAGEMENT METHOD AND SYSTEM

BACKGROUND OF THE INVENTION

1. Field of the Invention

This invention relates to information technology (IT), and more particularly, to a computer platform operating system compatibility management method and system which is designed for use in conjunction with a computer platform, such as a network server, for the computer platform to be selectively bootable between an old-version operating system (such as Windows NT4.0) and a new-version operating system (such as Windows Server 2003 or Windows 2000).

2. Description of Related Art

In the applications of network systems, Microsoft Corporation has introduced a series of server-oriented operating systems, including the earlier Windows NT4.0, Windows 2000, and the more advanced Windows Server 2003.

Although Windows Server 2003 and Windows 2000 are more advanced operating systems for servers, many enterprises nowadays are still using the earlier old-version Windows NT4.0 and reluctant to make upgrade for the following reasons: (1) established familiarity with Windows NT4.0; (2) many existing application programs were built on Windows NT4.0 and upgrade to new-version operating systems could result in compatibility problems that would be highly cost consuming; (3) application programs running on Windows NT4.0 are already satisfactory for most business needs so that upgrade is considered unnecessary; and (4) upgrade to new-version operating system could result in system instability and costly maintenance. For these reasons, most enterprises nowadays are only willing to upgrade hardware and have no intention to upgrade Windows NT4.0 to more advanced operating systems such as Windows Server 2003.

As a result, server manufacturers nowadays are still often asked by their enterprise customers to offer servers that support Windows NT4.0. In practical implementation, however, in order to allow today's newer and more advanced servers to support the old-version Windows NT4.0, it would often result in hardware incompatibility problems. For instance, the Intel Server Chipset SE75xx series define a new memory area called "T-segment" to serve as a storage area for storing SMI (System Management Interrupt) handling routines and related data. Many BIOS products, such as those offered by the Phoenix Corporation, support the T-segment storage area in memory. However, the use of T-segment with the Windows NT4.0 would undesirably result in hardware incompatibility problems. For example, during the installation of Windows NT4.0, it would cause the operating system to be unable to gain access to the floppy disk drive; i.e., if a server is equipped with Phoenix BIOS which utilizes a T-segment to serve as a storage area for storing SMI handling routines and related data, it would cause problem to the installation of Windows NT4.0 since the use of the T-segment would cause the floppy disk drive to be inaccessible, and since Windows NT4.0 requires the use of a floppy disk drive for installation and no other alternative methods are available, the installation of Windows NT4.0 would be unsuccessful. This problem is due to the fact that during the installation of Windows NT4.0, the installation program will search for available storage space in the Logical CPU MTRR block (where CPU=Central Processing Unit, and MTRR=Memory Type Range Register); and if the T-segment is found to be usable, it will utilize the T-segment as a usable storage area and then write a set of parameter data (such as a set of operating parameters for floppy disk drive) into the T-segment. However, since T-segment has a closed access attribute, it would undesirably cause the parameter data written into the T-segment to be later unable to be read out, thus causing the floppy disk drive to become inaccessible by the operating system. A user who requires the use of the floppy disk drive to load a driver during the Windows NT 4.0 installation process (for example, a SCSI driver will need to be loaded via the floppy disk drive so as to drive a SCSI controller that enables Windows NT 4.0 to be successfully installed in the SCSI hard disk) will not be able to install successfully.

SUMMARY OF THE INVENTION

It is therefore an objective of this invention to provide a computer platform operating system compatibility management method and system which allows a computer platform to be selectively bootable between an old-version operating system (such as Windows NT4.0) and a new-version operating system (such as Windows Server 2003 or Windows 2000).

The computer platform operating system compatibility management method and system is designed for use in conjunction with a computer platform, such as a network server, for the computer platform to be booted selectively between an old-version operating system (such as Windows NT4.0) and a new-version operating system (such as Windows Server 2003 or Windows 2000). This feature allows the customer to selectively install either an old-version operating system (such as Windows NT4.0) or an new-version operating system (such as Windows Server 2003 or Windows 2000) successfully onto the server, and allows both old-version operating system and new-version operating system to be compatible with the hardware of the server.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer platform operating system compatibility management method and system according to the invention is disclosed in full details by way of preferred embodiments in the following with reference to the accompanying drawings.

Figure 1:
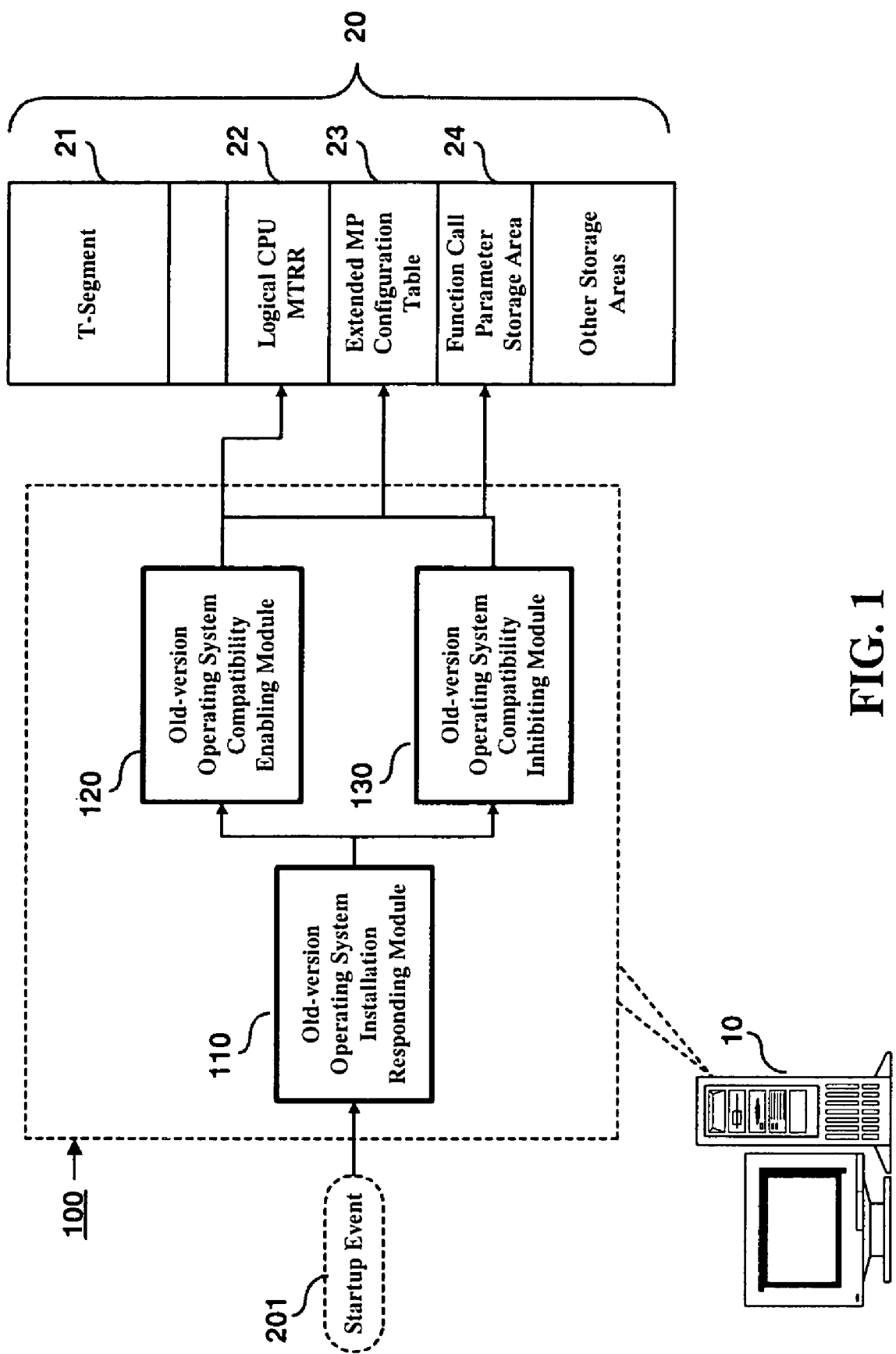
FIG. 1 is a schematic diagram showing the application architecture and modularized object-oriented component model of the computer platform operating system compatibility management system according to the invention.

FIG. 1 is a schematic diagram showing the application architecture and modularized object-oriented component model of the computer platform operating system compatibility management system according to the invention (as the part enclosed in the dotted box indicated by the reference numeral 100). As shown, the computer platform operating system compatibility management system of the invention 100 is designed for use in conjunction with a computer platform 10 (such as a network server) that is equipped with a memory unit 20 (such as BIOS) having a T-segment 21, a Logical CPU Memory Type Range Register (MTRR) 22, an Extended Multi-Processor (MP) Configuration Table 23, and a function call parameter storage area 24, that stores parameters of a system memory map to be called by a function call (e.g. BIOS INT 15h E820h), wherein the T-segment 21 is preset to serve as a storage area for storing SMI (System Management Interrupt) handling routines and related data. In practical implementation, for example, the computer platform operating system compatibility management system of the invention 100 can be realized as an add-on software/firmware module for integration to the BIOS (Basic Input/Output System) program in the computer platform 10.

Functionally, the computer platform operating system compatibility management system of the invention 100 is capable of allowing the computer platform 10 to be selectively bootable between an old-version operating system and a new-version operating system, where the old-version operating system is for example a Microsoft Windows NT4.0 operating system, while the new-version operating system is for example a Microsoft Windows Server 2003 or Windows 2000 operating system.

As shown in FIG. 1, the object-oriented component model of the computer platform operating system compatibility management system of the invention 100 comprises: (a) an old-version operating system installation responding module 110; (b) an old-version operating system compatibility enabling module 120; and (c) an old-version operating system compatibility inhibiting module 130. In practical implementation, the computer platform operating system compatibility management system of the invention 100 can be fully realized as computer program and integrated as an add-on firmware module to the BIOS (Basic Input/Output System) program in the computer platform 10.

The old-version operating system installation responding module 110 is capable of being activated in response to a startup event 201 on the computer platform 10 (i.e., when the computer platform 10 undergoes power-on or reset) to detect whether an old-version operating system (i.e., Windows NT4.0) is being selected by the user for installation to the computer platform 10; if YES, the old-version operating system installation responding module 110 issues an enabling message, and if NO, an inhibiting message. In practical implementation, for example, this old-version operating system installation responding module 110 can be realized as an add-on module named "NT4.0 Installation Workaround" for integration to the existing BIOS setup utility, and which is capable of being activated in response to the startup of the computer platform 10 to display two options [Enabled] and [Disabled] for user selection. If the user selects the [Enable] option, then the old-version operating system installation responding module 110 will responsively issue an enabling message; and if [Disabled] option is selected, the old-version operating system installation responding module 110 will responsively issue an inhibiting message.

Figure 2:
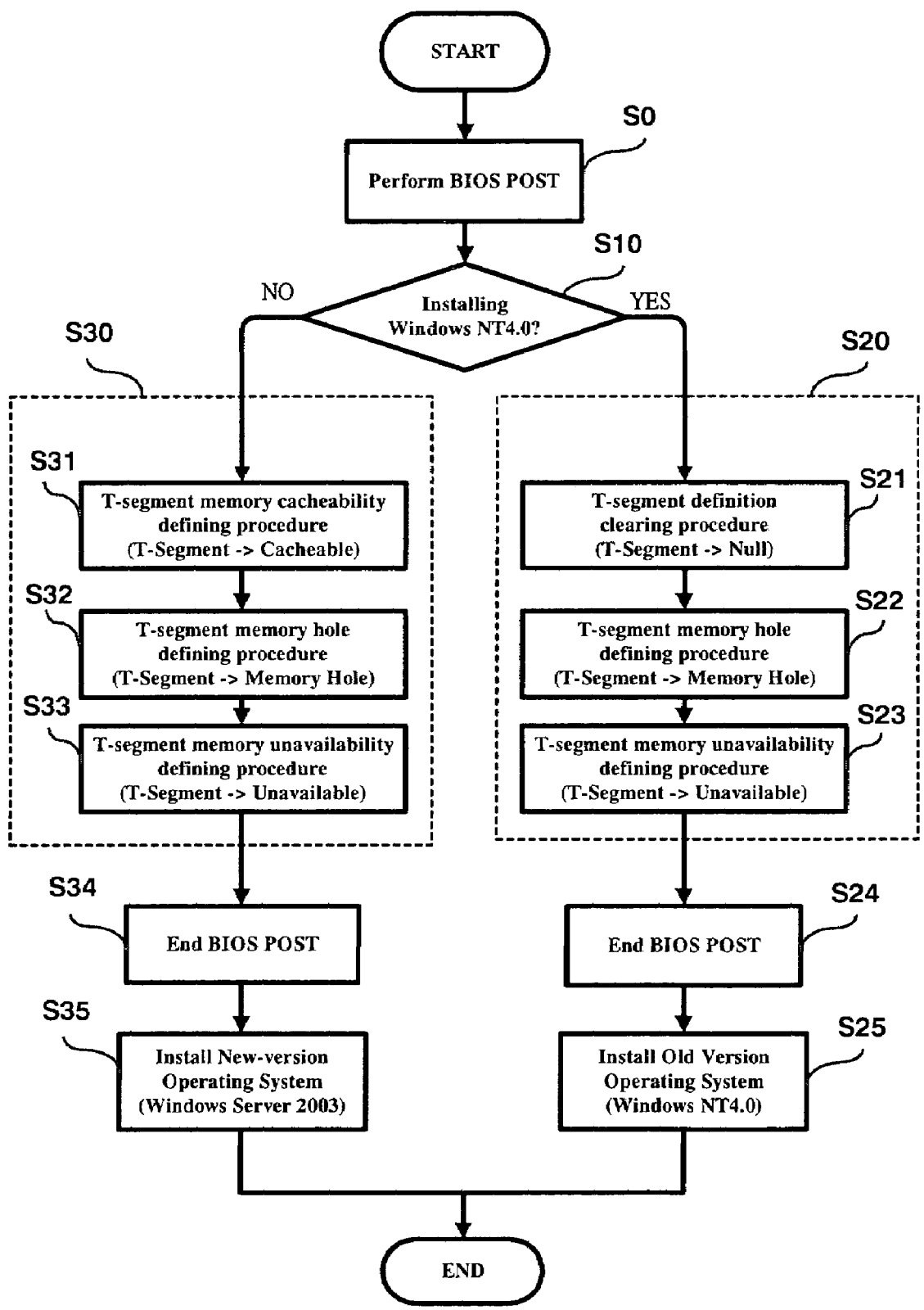
FIG. 2 is a flow diagram showing an operating procedure performed by the computer platform operating system compatibility management system of the invention for booting up a computer platform.

The old-version operating system compatibility enabling module 120 is capable of responding to the enabling message from the old-version operating system installation responding module 110 by performing an old-version operating system compatibility enabling procedure (S20) as shown in FIG. 2, which includes the following three subprocedures:

(S21) a T-segment definition clearing procedure;

(S22) a T-segment memory hole defining procedure; and (S23) a T-segment memory unavailability defining procedure;

wherein the T-segment definition clearing procedure (S21) is used to clear all preset T-segment definitions in every Logical CPU Memory Type Range Register 22 in the computer platform 10;

the T-segment memory hole defining procedure (S22) is used to define the T-segment 21 as a memory hole in the Extended Multi-Processor Configuration Table 23 in the computer platform 10; and the T-segment memory unavailability defining procedure (S23) is used to define the T-segment 21 as an unavailable memory area in the function call parameter storage area 24 in the computer platform 10.

As the old-version operating system compatibility enabling module 120 completes the execution of the above-mentioned three procedures (S21), (S22), and (S23), it will allow the computer platform 10 to be bootable to the old-version operating system (i.e., Windows NT4.0).

On the other hand, the old-version operating system compatibility inhibiting module 130 is capable of responding to the inhibiting message from the old-version operating system installation responding module 110 by performing an old-version operating system compatibility inhibiting procedure (S30) as shown in FIG. 2, which includes the following three subprocedures:

(S31) a T-segment memory cacheability defining procedure;

(S32) a T-segment memory hole defining procedure; and (S33) a T-segment memory unavailability defining procedure;

wherein the T-segment memory cacheability defining procedure (S31) is used to define the T-segment 21 as a cacheable memory area in Logical CPU Memory Type Range Register 22 in the computer platform 10;

the T-segment memory hole defining procedure (S32) is used to define the T-segment 21 as a memory hole in the Extended Multi-Processor Configuration Table 23 in the computer platform 10; and the T-segment memory unavailability defining procedure (S33) is used to define the T-segment 21 as an unavailable memory area in the function call parameter storage area 24 in the computer platform 10.

As the old-version operating system compatibility inhibiting module 130 completes the execution of the above-mentioned three procedures (S31), (S32), and (S33), it will allow the computer platform 10 to be bootable to the new-version operating system (i.e., Windows Server 2003 or Windows 2000).

Referring to FIG. 2 together with FIG. 1, in actual operation, when a startup event 201 in initiated on the computer platform 10, the first step S0 is to perform a BIOS POST (Power-On Self Test) procedure; and then the step (S10) is executed, wherein the old-version operating system installation responding module 110 is activated to detect whether an old-version operating system (i.e., Windows NT4.0) is being selected by the user for installation to the computer platform 10. If YES, the old-version operating system installation responding module 110 issues an enabling message to activate the execution of the old-version operating system compatibility enabling procedure (S20), and whereas if NO, the old-version operating system installation responding module 110 issues an inhibiting message to activate the execution of the old-version operating system compatibility inhibiting procedure (S30).

In the old-version operating system compatibility enabling procedure (S20), the T-segment definition clearing procedure (S21) is first executed to clear all preset T-segment definitions in every Logical CPU Memory Type Range Register 22 in the computer platform 10; and then the T-segment memory hole defining procedure (S22) is executed to define the T-segment 21 as a memory hole in the Extended Multi-Processor Configuration Table 23 in the computer platform 10; and finally, the T-segment memory unavailability defining procedure (S23) is executed to define the T-segment 21 as an unavailable memory area in the function call parameter storage area 24 in the computer platform 10.

After the old-version operating system compatibility enabling procedure (S20) is completed, the Step (S24) is executed to complete the BIOS POST procedure; and then the Step (S25) is executed to install the old-version operating system (i.e., Windows NT4.0) onto the computer platform 10.

On the other hand, in the old-version operating system compatibility inhibiting procedure (S30), the T-segment memory cacheability defining procedure (S31) is first executed to define the T-segment 21 as a cacheable memory area in Logical CPU Memory Type Range Register 22 in the computer platform 10; then the T-segment memory hole defining procedure (S32) is executed to define the T-segment 21 as a memory hole in the Extended Multi-Processor Configuration Table 23 in the computer platform 10; and finally, the T-segment memory unavailability defining procedure (S33) is executed to define the T-segment 21 as an unavailable memory area in the function call parameter storage area 24 in the computer platform 10.

After the old-version operating system compatibility inhibiting procedure (S30) is completed, the Step (S34) is executed to complete the BIOS POST procedure; and then the Step (S35) is executed to install the new-version operating system (such as Windows Server 2003) onto the computer platform 10.

In conclusion, the invention provides a computer platform operating system compatibility management method and system for use with a computer platform, such as a network server, for the computer platform to be booted selectively between an old-version operating system (such as Windows NT4.0) and a new-version operating system (such as Windows Server 2003 or Windows 2000). This feature allows the customer to selectively install either an old-version operating system (Windows NT4.0) or an new-version operating system ((such as Windows Server 2003 or Windows 2000) successfully onto the server, and allows both old-version operating system and new-version operating system to be compatible with the hardware of the server. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer platform operating system compatibility management method for use on a computer platform of the type equipped with a memory unit having a T-segment, a Logical CPU Memory Type Range Register, an Extended Multi-Processor Configuration Table, and a function call parameter storage area that stores parameters of a system memory map, where the T-segment is preset to serve as a storage area for storing system management interrupt handling routines and related data, with the purpose of allowing the computer platform to be selectively bootable between an old-version operating system and a new-version operating system;

computer platform operating system compatibility management method comprising:

detecting whether the old-version operating system is being user-selected for installation to the computer platform; if YES, activating an old-version operating system compatibility enabling procedure; and if NO, activating an old-version operating system compatibility inhibiting procedure;

wherein the old-version operating system compatibility enabling procedure includes:

a T-segment definition clearing procedure, which is used to clear all preset T-segment definitions in every Logical CPU Memory Type Range Register in the computer platform;

a T-segment memory hole defining procedure, which is used to define the T-segment as a memory hole in the Extended Multi-Processor Configuration Table in the computer platform; and a T-segment memory unavailability defining procedure, which is used to define the T-segment as a memory hold in the Extended Multi-Processor Configuration Table in the computer platform; and a T-segment memory unavailability defining procedure, which is used define the T-segment as an unavailable memory area in the function call parameter storage area in the computer platform;

and wherein the old-version operating system compatibility inhibiting procedure includes:

a T-segment memory cacheability defining procedure, which is used to define the T-segment as a cacheable memory area in Logical CPU Memory Type Range Register in the computer platform;

a T-segment memory hole defining procedure, which is used to define the T-segment as a memory hole in the Extended Multi-Processor Configuration Table in the computer platform; and a T-segment memory unavailability defining procedure, which is used to define the T-segment as an unavailable memory area in the function call parameter storage area in the computer platform.

2. The computer platform operating system compatibility management method as set forth in claim 1, wherein the computer platform is a network server.

3. The computer platform operating system compatibility management method as set forth in claim 1, wherein the old-version operating system is a Windows NT4.0 operating system.

4. A storage medium, for storing a computer program comprising a plurality of program codes, wherein the computer program is loaded to a computer platform of the type equipped with a memory unit having a T-segment, a Logical CPU Memory Type Range Register, an Extended Multi-Processor Configuration Table, and a function call parameter storage area, wherein the T-segment is preset to serve as a storage area for storing system management interrupt; handling routines and related data, and steps the computer platform executes comprise:

detecting whether the old-version operating system is being user-selected for installation to the computer platform; if YES, activating an old-version operating system compatibility enabling procedure and if NO, activating an old-version operating system compatibility inhibiting procedure, wherein the old-version operating system compatibility enabling procedure comprises:
- a T-segment definition clearing procedure, which is used to clear all preset T-segment definitions in every Logical CPU Memory Type Range Register in the computer platform;
- a T-segment memory hole defining procedure, which is used to define the T-segment as a memory hole in the Extended Multi-Processor Configuration Table in the computer platform; and
- a T-segment memory unavailability defining procedure, which is used to define the T-segment as an unavailable memory area in the function call parameter storage area in the computer platform;

and wherein the old-version operating system compatibility inhibiting procedure comprises:
- a T-segment memory cacheability defining procedure, which is used to define the T-segment as a cacheable memory area in Logical CPU Memory Type Range Register in the computer platform;
- a T-segment memory hole defining procedure, which is used to define the T-segment as a memory hole in the Extended Multi-Processor Configuration Table in the computer platform; and
- a T-segment memory unavailability defining procedure, which is used to define the T-segment as an unavailable memory area in the function call parameter storage area in the computer platform.

5. The storage medium as set forth in claim 4, wherein the computer platform is a network server.

6. The storage medium as set forth in claim 4, wherein the old-version operating system is a Windows NT4.0 operating system.

* * * * *